United States Patent [19]
Stricker

[11] 4,371,208
[45] Feb. 1, 1983

[54] GATE PANEL OPERATOR FOR SIDE DUMPING VEHICLES

[76] Inventor: Stanley S. Stricker, 915 K St., Gering, Nebr. 69341

[21] Appl. No.: 253,199

[22] Filed: Apr. 13, 1981

[51] Int. Cl.³ .............................................. B60P 1/04
[52] U.S. Cl. ................................. 298/23 D; 105/276; 296/36; 276/57 R; 296/184; 298/18
[58] Field of Search ................ 298/22 R, 22 P, 23 R, 298/23 D, 23 DF, 23 MD, 23 S, 23 A, 23 B, 23 F, 18, 13; 296/57 R, 57 A, 36, 184; 49/339, 340, 345; 105/275, 276

[56] References Cited

U.S. PATENT DOCUMENTS

| | | |
|---|---|---|
| 1,300,810 | 4/1919 | Ballou . |
| 1,373,628 | 4/1921 | Nelson . |
| 2,394,153 | 2/1946 | Correa ................................. 298/18 |
| 2,437,890 | 3/1948 | Orendorff ............................ 298/22 |
| 2,595,836 | 5/1952 | Fraunfelder ........................ 105/274 |
| 2,661,235 | 12/1953 | Isachsen ................................ 298/18 |
| 3,450,436 | 6/1969 | Phillips ................................. 298/11 |
| 3,493,265 | 2/1970 | Triggs .................................. 298/18 |
| 3,884,526 | 5/1975 | Sweet et al. ...................... 298/18 A |
| 3,890,006 | 6/1975 | Stockwell ........................ 298/23 D |
| 4,087,129 | 5/1978 | Maxey ................................. 298/18 |

*Primary Examiner*—Robert J. Spar
*Assistant Examiner*—Donald W. Underwood

[57] ABSTRACT

In a dump box attachment, a gate panel operator includes a pair of pivotally interconnected lever arms which are operatively associated with each end of a gate panel, each pair of arms being operative automatically in response to the tilting or lifting movement of the dump box to amplify that movement in prematurely opening the gate panel so as to unload the contents of the box without imposing substantial loads on the panel.

15 Claims, 5 Drawing Figures

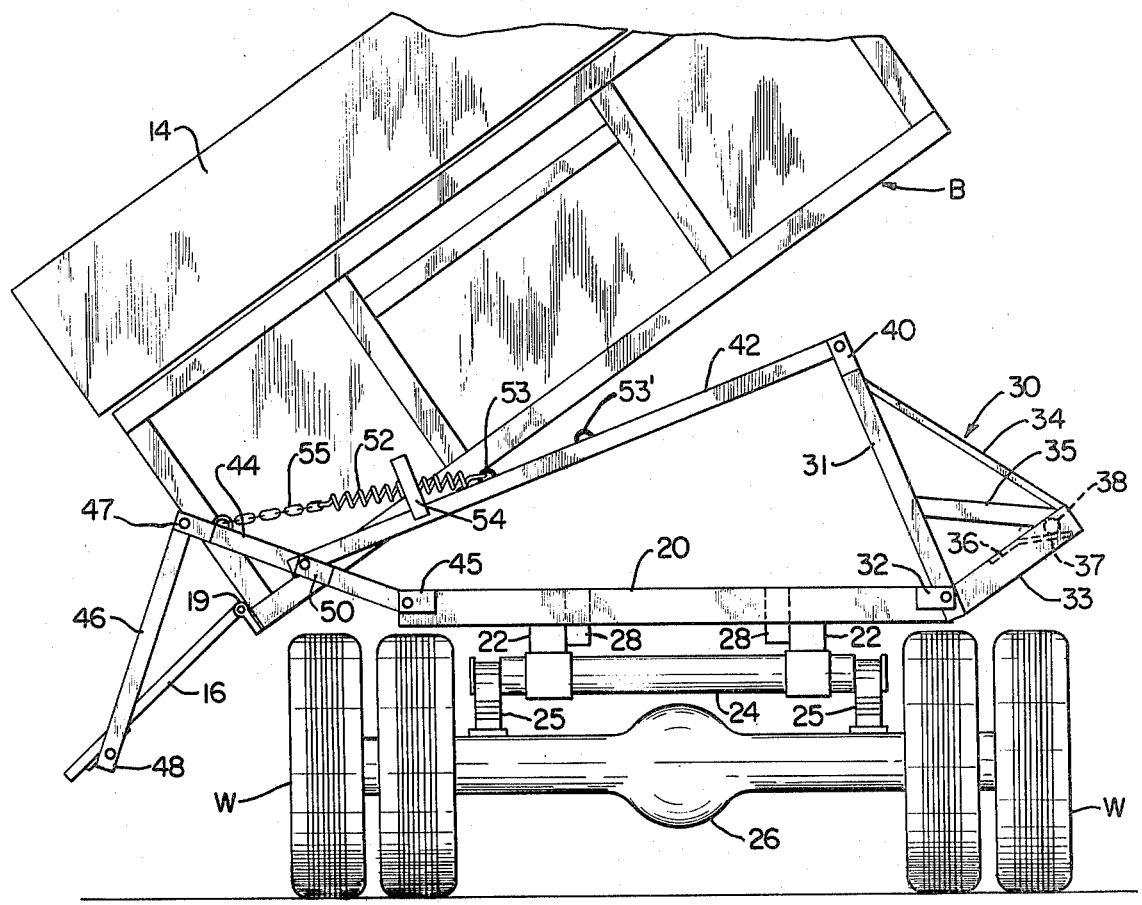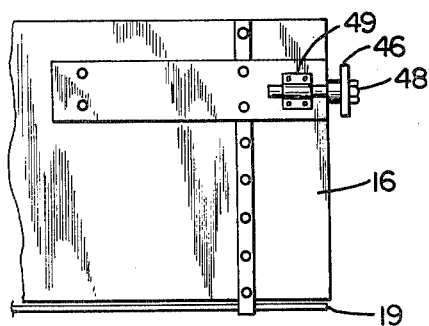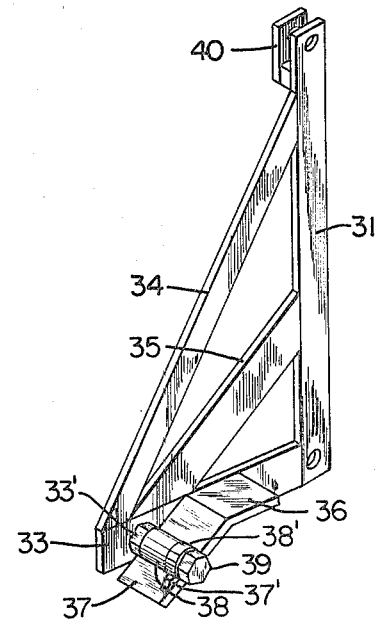

GATE PANEL OPERATOR FOR SIDE DUMPING VEHICLES

This invention relates to gate panel operators, and more particularly relates to a novel and improved gate panel control for dump boxes, especially those of the side dumping variety and which is responsive automatically to lifting and lowering of the dump box to regulate opening and closing of the gate panel.

BACKGROUND AND FIELD OF THE INVENTION

Side dumping vehicles customarily employ gate panel operators to control opening and closing of the side panel or sideboard along one side of the dump box. Typically, the side panel is pivotally secured along its lower margin to the box and is adapted to swing outwardly and downwardly about its pivotal or hinged connection to the box as the dump box is tilted or otherwise lifted into the dumping position so as to permit the contents of the box to be expelled by gravity. Ordinarily, in the past, gate panel control mechanisms have required manual assistance or some positive means of control running from the gate panel control to the cab of the vehicle. Representative of such approaches are disclosed in U.S. Pat. Nos. to Triggs 3,493,265 and Maxey 4,087,129. In the latter, a cable is extended between the gate and a motive drive system and requires positive operation of that drive system in order to operate the gate panel between the opening and closing positions.

Other systems have been devised which are designed to operate automatically in response to lifting and lowering of the dump box to regulate opening and closing movement of the gate panel. Generally, however, such systems have required fairly sophisticated mechanisms and adjustments to conform to each size and type of dump box and are either expensive or difficult to manufacture and install. Most importantly, however, such operators have not been designed in such a way as to cause premature opening of the gate panel so as to avoid imposition of substantial loads on the gate panel as the dump box is tilted into the unloading position. In other words, the weight of the load in the dump box is at least partially relied upon to impart opening movement to the gate panel. Representative of gate panel operators which operate in response to tilting movement of the dump box are U.S. Pat. Nos. to Ballou 1,300,810, Fraunfelder 2,595,836, Orendorff 2,437,890 and Correa 2,394,153. Also representative of such gate panel operators are Canadian Pat. No. 1,000,763 and German Pat. No. 24,215. For instance in Orendorff, a side linkage mechanism is regulated by a motive drive system in the form of a hydraulic unit to control opening and closing of a dump cart. In Fraunfelder, a compression column operates in association with a rocker member and actuator link as somewhat of a toggle mechanism in controlling the opening and closing movement of a gate panel. Similarly, the patent to Correa discloses a toggle-type mechanism to control opening and closing of a side board for a dump box with a spring-loaded return mechanism to cause the side board to return to its original closed position after the unloading operation.

SUMMARY OF THE INVENTION

It is therefore an object of the present invention to provide for a novel and improved gate panel operator which is so constructed and arranged as to control opening of a pivotal side or end gate of a dump box.

It is another object of the present invention to provide for a gate panel operator mechanism which is automatically responsive to tilting of a dump box to accelerate the opening movement of the panel so as to remove or minimize application of weight by the contents of the dump box on the panel.

It is a further object of the present invention to provide for a novel and improved gate panel control mechanism which eliminates the use of a side chains, is low in cost and is easily installed with no external or remote operator control required.

In accordance with the present invention, a gate panel operator has been devised in which a linkage assembly operates as a motion amplifier which is responsive to limited raising or tilting of the dump box to rapidly swing or pivot a gate panel into a lowered or downwardly inclined unloading position; and conversely is operative to return the gate panel to a raised or closed position smoothly without jarring the panel when the box is returned to a level position. Broadly, this is accomplished by mounting of a linkage mechanism on the frame of the vehicle for upward extension across opposite ends of the dump box with one end of the linkage mechanism connected to an end of the gate panel to be controlled in opening and closing. Each linkage mechanism is comprised of a first lever arm pivotally connected to the frame, laterally extending limit stop means in the form of a pad engageable by the dump box when in the level position, and motion amplifying means including a second upwardly extending lever arm laterally spaced from and pivotally interconnected to the first lever arm and to the upper free end of the side panel. The relative length of the lever arms and their pivotal connection is such as to accelerate movement of the side panel relative to tilting movement of the dump box in advancing the panel to the unloading position without relying on the side pressure of the load in the dump box. Preferably, the laterally spaced, upwardly extending lever arms are so arranged as to operate on the principle of a toggle mechanism in that once the laterally spaced lever arms move past dead center they are capable of moving independently of the lifting of the dump box in the opening direction and with the movement of the second lever arm being at a greater velocity than that of the first lever arm to accelerate the opening movement of the panel.

As the dump box is returned toward the level position, it will in approaching the level position engage the limit stop means of the first lever arm so as to cause reverse movement of the lever arms in returning the gate panel to its closed position smoothly without jarring or slamming the panel into the closed position. Return movement of the panel is aided initially by a return spring associated with the second lever arm to initially impart a lifting motion to the gate panel.

The above and other objects, advantages and features of the present invention will become more readily appreciated and understood from a consideration of the following detailed description of a preferred embodiment of the present invention when taken together with the accompanying drawings, in which:

BRIEF DESCRIPTION OF THE DRAWINGS

FIG. 3 is another rear end view illustrating the dump box in the tilted or dumping position and with the side panel advanced into an open position for unloading;

FIG. 4 is an enlarged fragmentary view of a portion of the support frame on the vehicle; and FIG. 5 is an enlarged perspective view illustrating a preferred form of bell crank type of lever arm which forms a part of the preferred linkage mechanism of the present invention.

DETAILED DESCRIPTION OF THE PREFERRED EMBODIMENT

Figure 1:
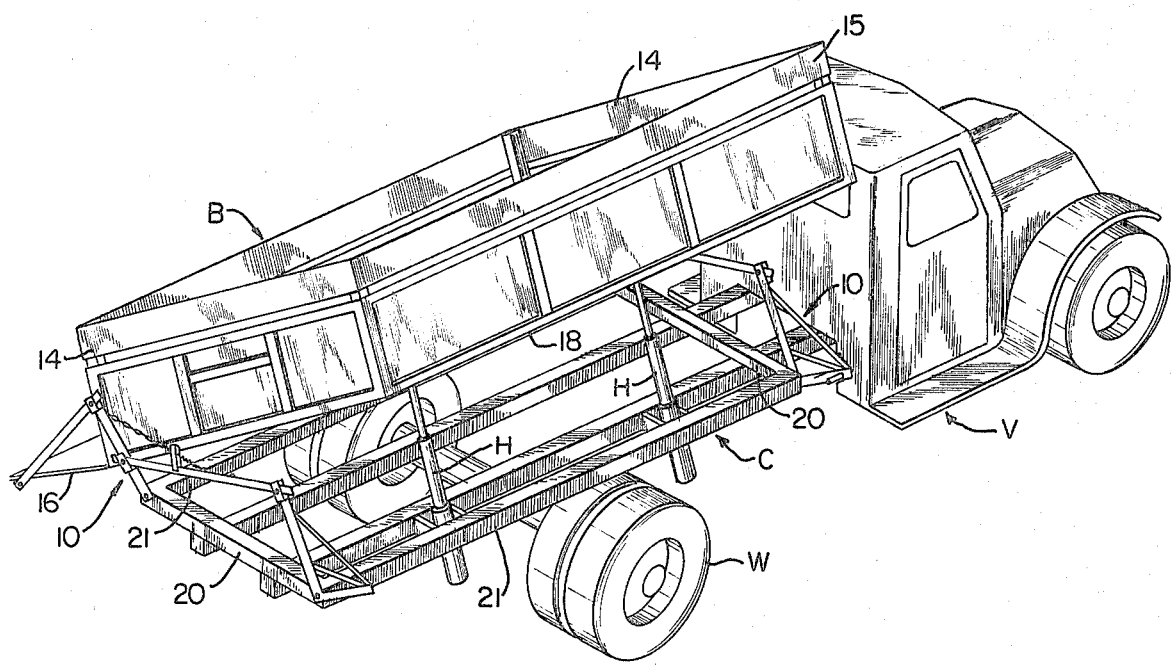
FIG. 1 is a somewhat perspective view illustrating the preferred form of linkage mechanism of the present invention in attached relation to a side dumping vehicle.

Referring in detail to the drawings, there is shown by way of illustrative example in FIG. 1 the mounting and disposition of a preferred form of linkage mechanism 10, there being a linkage mechanism 10 mounted at opposite ends of a frame or chassis C on a side dumping vehicle V in which a dump box designated at B is elevated and lowered by means of hydraulic cylinder units H. The vehicle V as shown is representative of various types of conventional types of side dumping vehicles and specifically wherein a generally rectangular dump box is controlled for movement between a level position resting on the frame C and an elevated or tilted position as shown in FIG. 1. As will become more apparent hereinafter, however, the linkage mechanism 10 of the present invention is conformable for use with side or end dumping vehicles and, as a setting for the present invention, is specifically described with reference to a side dumping vehicle. Here, the dump box B has opposite end walls or panels 14, a first side panel 15 and a second pivotal side panel 16, the side and end panels 14 to 16, inclusive, extending upwardly from a common bottom wall or load bed 18. As further noted from a consideration of FIGS. 2 and 3, the side panel 16 is hinged as at 19 about its lower end to one outer side edge of the bottom wall 18.

Figure 2:
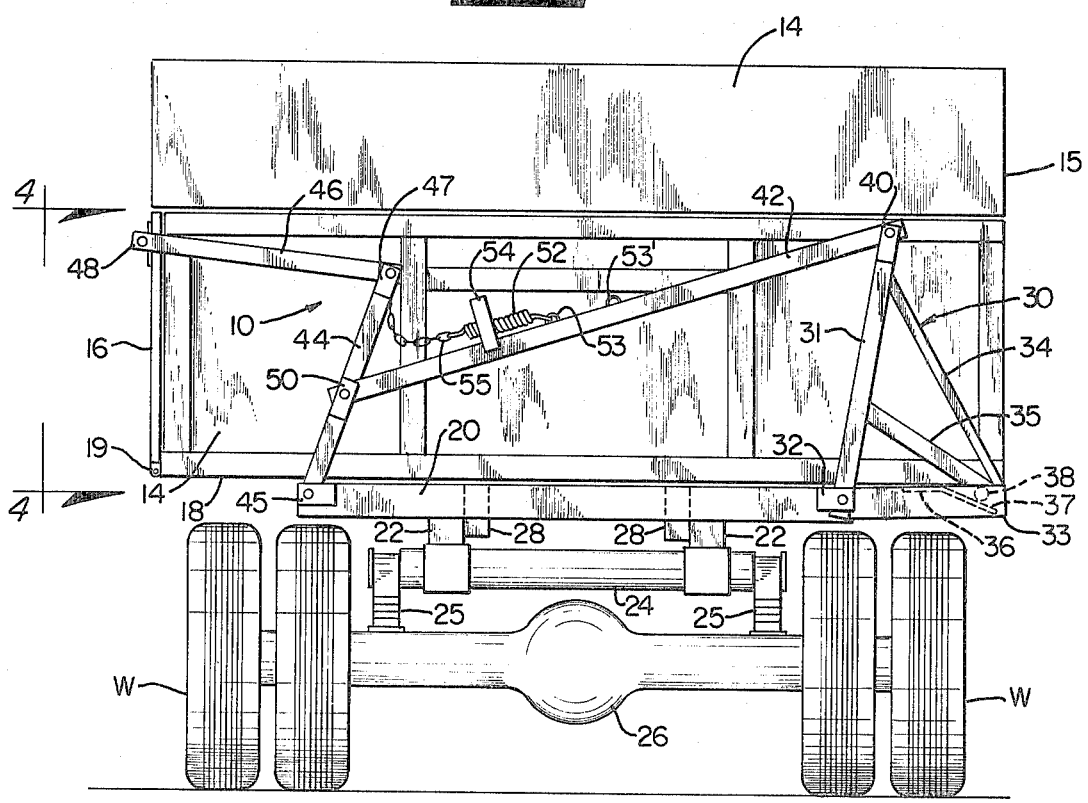
FIG. 2 is a rear end view of the preferred form of invention shown in FIG. 1 and with the dump box illustrated in the level position.

In the representative form of vehicle shown in FIGS. 1 to 3, the chassis C comprises an outer rectangular frame having opposite end frame members 20 interconnected by side frames 21 into a rigid rectangular frame assembly attached to longitudinally extending stringers 22 which are disposed upon an underframe 24, the latter supported on each side by springs 25 above the differential 26 into the rear ground-engaging wheels W. Typically, angle iron clips 28 are mounted just inwardly of the stringers 22 and interconnected into the end frames 20, all in accordance with conventional practice.

The preferred form of linkage mechanisms 10 are adapted for mounting on the outside surfaces of the end frames 20 just outwardly of the opposite end panels 14 of the dump box; and since the mounting and relative disposition of the linkage mechanisms to the end frames 20 and end panels 14 are identical, a description of one of the linkage mechanisms and its interrelationship to the dump box B will suffice for both. Specifically referring to the rear linkage mechanism as illustrated in FIGS. 2 and 3, a generally triangular lever arm assembly 30 which operates on the principle of a bell crank 30 includes an upwardly extending lever arm 31 pivotally mounted at its lower end to a clip or bracket 32 which is welded to the outside surface of the end frame 20 on a side of the frame opposite to the pivotal side panel 16 of the dump box. A laterally extending control arm 33 extends from the lower end of the lever arm 31 and is rigidly connected to the lever arm 31 with the aid of diagonal braces 34 and 35. As best seen from FIG. 5, one side of the control arm or plate 33 includes a forwardly directed hold-down pad 36 welded to the plate and provided with a downwardly inclined surface portion 37 upon which is positioned a roller 38, the latter secured in position above the inclined surface by a bushing 38' welded as at 37' to the surface portion 37. A bolt or other form of fastener 39 is advanced through the bushing 38' and into a nut 33' which is welded to the plate 33. Accordingly, the sleeve 38 is journaled between the nut 33' and bushing 38' so as to be free to undergo limited rotation when engaged by the dump box B. The upper end of the lever arm 31 has a bifurcated end portion or clip 40 which is adapted for pivotal interconnection of one end of a movable link member 42.

A second upwardly extending lever arm 44 has its lower end pivotally connected by means of a bracket or clip 45 to the rear end frame 20 at one end of that frame member adjacent to the side panel 16. A reach rod or link 46 is pivotally connected to upper bifurcated end clip 47 of the second lever arm 44 and extends substantially in a horizontal or lateral direction away from the upper end of the second lever arm for releasable connection by means of a suitable latch or bolt 48 to the upper free end of the side panel 16. In turn, the link 42 extends from pivotal connection at 40 to the upper end of the first lever arm 31 in a downwardly inclined direction across the end of the dump box for pivotal connection to a clip 50 located intermediately of the second lever arm 44. A return spring 52 has one end secured to an eye 53 on the upper surface of the link 42, the return spring extending along the upper surface of the link through a retainer bracket 54 and with the end opposite to the eye 53 attached to a chain 55 which extends downwardly from the upper pivotal end 47 of the lever arm 44.

FIG. 4 illustrates in more detail the interconnection of the latch 48 into a keeper 49 on the side panel 16. In operation, when the dump box B is in a level position as illustrated in FIG. 2, each of the linkage mechanisms 10 will be in the retracted position as shown with the side panel 16 raised or in a closed position. In this relation, the bearing or support sleeve 38 rests beneath one side of the dump box which is to be raised or tilted and specifically is positioned beneath the bottom wall 18. Initially, as the dump box is raised upwardly by the hydraulic units H, it will simultaneously cause the side panel 16 to tilt downwardly so as to cause movement of the reach rods or links 46 to the left, as viewed in FIGS. 2 and 3, and to cause corresponding movement of the lever arms 31 and 44 until the arms 31 and 44 move past a dead center position at right angles to the end frame 20. As the lever arms 31 and 44 move past dead center, the relative velocity of the lever arm 44 with respect to the lever arm 31 will increase thereby causing the arm 46 to rapidly accelerate in movement and to advance the side panel 16 into the fully opened position, as shown in FIG. 3, well ahead of the upward tilting movement of the dump box. This movement is assisted in part by the weight of the side panels 16 acting on the arm 46 even without the side pressure of a load in the dump box and is sufficient to overcome any resistance of the spring 52 which in the fully opened position of the gate panel will be stretched and under some tension as illustrated in FIG. 3. After the dump box reaches the fully elevated or tilted position and the load or contents of the box fully removed, the box may be returned to the closed position through actuation of the hydraulic units H. The linkage mechanisms 10 will remain stationary until the bottom wall panel 18 of the box has moved into engagement with the support sleeve 38 and, as the sleeve and attached bell crank 30 are pivoted downwardly about the pivotal connection 32 will initiate return movement of the gate panel 16 toward the closed position. The return spring 52 will cooperate initially by imparting somewhat of a lifting motion to the second lever arm 44 and to the gate panel 16. As the lever arms 31 and 44 move past center, the return movement of the gate panel 16 will once again be accelerated in approaching the closed position until the original level position of the dump box B, as illustrated in FIG. 2, is assumed.

From the foregoing, it will be appreciated that the linkage mechanism 10 of the present invention is capable of raising and lowering the side board or panel 16 of the dump box B without any physical assistance but is automatically responsive to the raising and lowering of the dump box B. The return spring 52 will resist any sudden movement of the side panel 16 as it approaches the open position. In this relation, another eye 53' is mounted on the link arm 42 in spaced relation to the eye 53 to serve as an optional mounting for the end of the spring 52. The optional mounting 53' will increase the spring tension on the side panel as it moves into the unloading position. Most importantly the linkage mechanism is designed to relieve the pressure of the load on the side panel 16 as soon as the box B is raised a matter of but a few inches above its normally level position, since the side panel 16 will rapidly move into the fully opened position and in this way keep any side pressure or weight off of the panel. Again, in returning to the closed position only when the box approaches that position and advances into engagement with the support sleeve 38 will the sideboard 16 begin to close; and when the box reaches the level position the support sleeve 38 will be held down by the dump box B to retain the panel in the closed position. In this respect, the more weight in the box, the greater will be the urging of the side panel 16 into the closed position. As a result, side chains are not required.

The installation of the linkage mechanisms 10 is such that only two connection points are required into the chassis or frame and specifically the points of connection of the lever arms 31 and 44 to the end frames 20. As a result, if the dump vehicle includes a back or end dump as well, all that is required is to remove the latches 48 connecting the linkage mechanisms to the side panel and to remove the pivot pins connecting the lower ends of the lever arms to the end frames. Further in this connection, chains may be employed as a safety measure if desired and, even though they may be accidentally left attached during the dumping operation, will not tear up the unit. It will further be evident that the linkage mechanism of the present invention is conformable for various types of dump boxes or cargos whether to be side or end dumped, is low in cost and easily installed or removed as required.

In the preferred form, it will be noted that the lever arm 31 is slightly longer than the lever arm 44, the lever arm 31 extending preferably a distance corresponding to the height of the box so as to provide the necessary leverage in returning the side panel to the closed position. In turn, the connection points of the link arm 42 between the lever arms 31 and 44 are important from the standpoint of regulating the relative velocity between the lever arms; yet, to impart the necessary leverage through the lever arm 44 in raising the side panel 16 into the closed position. To this end, the link arm 42 is connected to the upper extremity of the lever arm 31 and to the midpoint of the lever arm 44 in the preferred form, although it is to be understood that the precise position of the link arm 42 and its points of pivotal connection to the lever arms may be varied depending upon the rate of travel desired for the side panel and the leverage required for returning the side panel into the closed position.

It is therefore to be understood from the foregoing that various modifications and changes may be made in the construction and arrangement of parts comprising the present invention without departing from the spirit and scope thereof as defined by the appended claims.

I claim:

1. In a side dumping vehicle wherein a dump box is supported on a frame of the vehicle, said dump box having opposite side and end panels, one of said side panels pivotally mounted about its lower end for swinging movement between an open and closed position when said dump box is advanced between an inclined dumping position and a level position, respectively, the combination therewith of a panel operator disposed at least at one end of said dump box extending substantially at right angles to said one side panel comprising:
    first and second lever arm members pivotally connected to said frame in spaced-apart relation to one another for upward extension therefrom;
    limit stop means associated with one of said lever arms;
    pivotal connecting means pivotally interconnecting said first and second lever arms in spaced relation above their points of pivotal connection to said frame; and
    a connector arm pivotally interconnecting one of said first and second lever arm members to the upper end of said one side panel whereby tilting movement of said dump box is operative to initiate pivotal movement of said first and second lever arm members while permitting upward movement of said limit stop means, said lever arm members being so constructed and arranged that the relative velocity of said one lever arm member interconnected to said side panel is greater than that of the other of said first and second lever arm members to advance said side panel into the open position independently of the side pressure exerted by the load carried in said dump box.

2. In a side dumping vehicle according to claim 1, said limit stop means associated with one of said first and second lever arms is engageable with said dump box.

3. In a side dumping vehicle according to claim 1, said limit stop means defined by a laterally extending arm associated with one of said first and second lever arm members and engageable with the underside of said dump box when said dump box is in the level position.

4. In a side dumping vehicle according to claim 1, said pivotal connecting means defined by a link arm pivotally interconnecting the upper free end of said second lever arm to an intermediate portion of said one lever arm.

5. In a side dumping vehicle according to claim 1, said connector arm pivotally interconnecting the upper free end of said one lever arm to the upper end of said panel.

6. In a side dumping vehicle according to claim 1, there being a panel operator disposed at opposite ends of said dump box.

7. In a side dumping vehicle according to claim 1, including a return member yieldingly urging said side panel in a closing direction when said side panel is disposed in its open position.

8. In a side dumping vehicle according to claim 1, said limit stop means being engageable with the underside of said dump box adjacent to a side panel opposite to said pivotally mounted side panel.

9. A dump vehicle wherein a dump box is supported on a frame of said vehicle and has opposite side and end panels, one of said panels pivotally mounted about its lower end for swinging movement between an open and closed position when said dump box is advanced between an elevated dumping position and a lowered level position, respectively, a linkage mechanism extending substantially at right angles to said pivotally mounted panel comprising:

a bell crank pivotally connected to said frame having a first laterally extending control arm provided with limit stop means engageable by the underside of said dump box and an upwardly extending lever arm movable independently of said dump box when said dump box is elevated; and motion amplifying means pivotally connected to said frame in laterally spaced relation to said bell crank including means pivotally interconnecting said bell crank and said motion amplifying means and a connector arm pivotally interconnecting said motion amplifying means to the upper end of said panel, said motion amplifying means being operative to accelerate movement of said hinged panel relative to tilting movement of said dump box and pivotal movement of said bell crank so as to positively open said hinged panel independently of side pressure exerted by the load in said dump box.

10. A dump vehicle according to claim 9, said motion amplifying means having an upwardly extending lever arm laterally spaced from the upwardly extending lever arm of said bell crank, said lever arms being pivotally interconnected whereby to accelerate movement of said hinged panel relative to the rate of tilting movement of the dump box.

11. A dump vehicle according to claim 9, including spring-loaded return means to urge said hinged panel toward said closed position.

12. A dump vehicle according to claim 10, said lever arms being movable past a center position so as to be capable of moving independently of the lifting of said dump box in the opening direction.

13. A linkage mechanism for a side dump vehicle in which the vehicle includes a dump box supported on the frame of the vehicle, said dump box having a bottom wall interconnecting opposite side and end panels, one of said side panels being pivotally supported on said bottom wall for swinging movement between a closed upright position and a downwardly inclined open position, and means are provided for lifting and lowering said dump box between a level transport position and an inclined dumping position, said linkage mechanism comprising:

first and second lever arms pivotally connected to said vehicle frame in laterally spaced-apart relation to one another across an end panel of said dump box, said first lever arm being longer than said second lever arm and provided with laterally extending limit stop means engageable with the underside of said dump box relatively near said side panels opposite to said hinged side panel;

a pivotal link arm extending from pivotal connection to the upper free end of said longer lever arm into pivotal connection with an intermediate portion of said shorter lever arm;

a reach rod extending from pivotal connection to the upper free end of said shorter lever arm into pivotal connection with the upper free end of said pivotal side panel; and return spring means interconnecting said pivotal link arm and said shorter lever arm.

14. A linkage mechanism for a side dump vehicle according to claim 13, said limit stop means including a laterally directed control arm extending in a direction away from said pivotal side panel including a holddown member engageable with the underside of said dump box.

15. A linkage mechanism for a side dump vehicle according to claim 13, said first and second lever arms being pivotally connected to opposite sides of said frame.

* * * * *